United States Patent Office 3,362,948
Patented Jan. 9, 1968

3,362,948
MONOAZO DYESTUFFS CONTAINING BOTH TRIAZINE AND PYRIMIDINE GROUPS
Herbert Francis Andrew and Dennis Eckersley, Manchester, England, assignors to Imperial Chemical Industries Limited, London, England, a corporation of Great Britain
No Drawing. Filed June 28, 1966, Ser. No. 561,007
Claims priority, application Great Britain, May 19, 1961, 18,332/61
6 Claims. (Cl. 260—146)

This application is a continuation-in-part of our application Ser. No. 194,193, filed May 11, 1962, now abandoned.

This invention relates to new dyestuffs. More particularly the invention relates to new dyestuffs of the mono azo series, valuable for use as "reactive" dyestuffs for the colouration of textile materials containing acylatable amino and hydroxyl groups such as natural and regenerated cellulose, wool, silk and polyamide fibres and fabrics.

According to the invention there are provided the dyestuffs of the formula:

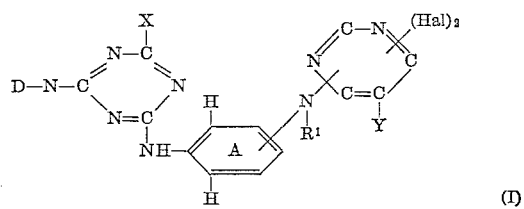

(I)

wherein D represents the radical of a water-soluble dyestuff of the mono azo series having the —NR— group attached to a carbon atom of the dyestuff radical, R and $R^1$ are independently selected from hydrogen and a lower alkyl group, X represents a non-labile group selected from methoxy, amino, substituted amino and hydroxyl groups, Hal represents a halogen atom selected from chlorine and bromine, Y represents a group selected from hydrogen, chlorine, bromine, cyano and aminocarbonyl, and wherein the residue A can be further substituted by a sulphonic acid group, or 1:1 and 1:2 metal complexes of these dyestuffs.

As examples of the lower alkyl groups which are represented by R and $R^1$ there may be mentioned methyl, ethyl, propyl and butyl groups.

As examples of substituted amino groups which are represented by X there may be mentioned methylamino, β-hydroxyethylamino, phenylamino, 3-sulphophenylamino, 4-sulphophenylamino, 2-carboxy-4-sulphophenylamino, 4-carboxyphenylamino, ethylamino, butylamino and 3,5-disulphophenylamino.

As can be seen from Formula I the new dyestuffs contain a chromophoric system represented by the symbol D, a non-reactive grouping consisting of a bridging triazinylamino radical, and connected to this triazine radical through an arylene diamine radical a pyrimidine radical which contains two labile halogen atoms.

The chromophoric system is the radical of a water-soluble mono azo dyestuff and contains one or more water-solubilising groups such as carboxylic acid, sulphonyl, alkylsulphonyl and, preferably, sulphonic acid. There may be coordinately bound metal present, for example chromium, cobalt or copper.

The new dyestuffs may be obtained by reacting together equimolecular proportions of a polyhalogenopyrimidine and a compound of the formula:

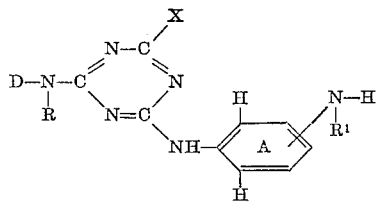

(2)

wherein D, R, $R^1$ and X have the meanings stated above.

The above process may conveniently be carried out by stirring an aqueous suspension or solution of the polyhalogenopyrimidine, adding an aqueous solution of the compound of Formula 2 and simultaneously or on completion of the addition, adding a solution of an acid-binding agent. The function of the acid-binding agent is to neutralise the hydrogen halide as it is formed during the reaction. Accordingly, any acid-binding agent may be used provided that it is not present in such quantity that it causes hydrolysis of the reactants or causes some other side-reaction. It is preferred to use an alkali-metal carbonate or bicarbonate, added at such a rate that the pH of the mixture stays within the range of 6.0 to 8.0. The temperature of the reaction may be between 20° and 100° C., dependent on the ease with which the reaction occurs. In general, polyhalogenopyrimidines require a temperature of the order of 40° to 80° C.

As examples of polyhalogenopyrimidines which may be used, there may be mentioned 2,4,6-trichloropyrimidine, 2,4,6-tribromopyrimidine, 2,4,5,6 - tetrachloropyrimidine, 2,4,5,6-tetrabromopyrimidine, 2,4,6 - trichloro - 5-cyanopyrimidine, 2,4,6-tribromo-5-cyanopyrimidine and 5-aminocarbonyl-2,4,6-trichloropyrimidine.

The compounds of Formula 2 are the condensation products of cyanuric chloride or cyanuric bromide with 1 mol each of the following compounds:

(a) a water-soluble dyestuff of the formula D—NHR where D and R have the meanings stated above, (b) an arylenediamino of the formula:

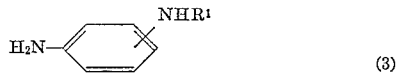

(3)

in which the aryl nucleus may be substituted by a sulphonic acid group, and where $R^1$ has the meaning stated above, the group —$NHR^1$ being attached to the aromatic nucleus in the meta- or para-position to the —$NH_2$ group. If desired an arylene-diamine of Formula 3 above may be used in which the hydrogen atom of the —$NHR^1$ group is replaced by an easily removable protective group, for example by a —CO.COOH or —$SO_3H$ group, so that the primary amine group may be reacted with a halogen atom on the triazine ring of the dyestuff intermediate followed by removal of the protective group with regeneration of the —$NHR^1$ group, which is then available for subsequent reaction with a polyhalogenopyrimidine.

(c) ammonia or a substituted amino, or an alkali-metal hydroxide.

In the case where X represents a methoxyl group, the compound of Formula 2 may be prepared by reacting the water-soluble dyestuff D—NHR with 2,4 - dichloro - 6-methoxy-1,3,5-triazine and then with an arylenediamine as defined in (b) above.

As examples of arylenediamines of Formula 3 there may be mentioned 4-amino-2-sulphoaniline, m-phenylenediamine, 1,3-diaminobenzene-4-sulphonic acid, 4-methylamino - 3 - sulphoaniline, 1,4 - diamino-benzenesulphonic acid, 4-methylaminoaniline, p-phenylenediamine.

As examples of alkali-metal hydroxides there may be mentioned sodium hydroxide and potassium hydroxide.

As examples of compounds of the type (a) there may be mentioned the dyestuff compounds of the following classes, without however, limiting the classes to those specifically described.

(1) Monoazo compounds of the formula:

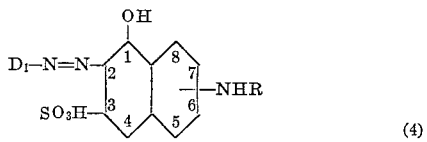

wherein $D_1$ represents a mono- or di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenol or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetyl-amino and alkoxy radicals such as methoxy.

(2) Monoazo compounds of the formula:

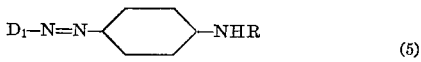

wherein $D_1$ stands for a mono or dicyclic aryl radical as described for class 1 and is preferably a disulphonaphthyl or a stilbene radical, and the benzene nucleus may contain further substituents such as halogeno atoms, or alkyl, alkoxy, carboxylic acid and acylamino groups (3) Mono-azo compounds of the formula:

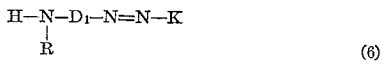

wherein $D_1$ represents an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(4) Mono azo compounds of the formula:

$$D_1-N=N-K_2-NHR \qquad (7)$$

wherein $D_1$ represents a radical of the types defined for $D_1$ in class 1 above and $K_2$ represents the radical of an enolisable ketomethylene compound (such as an acetoacetarylide or a 5-pyrazolone) having the —OH group in α-position to the azo group.

(5) The metal complex, e.g. the copper, chromium and cobalt complex, compounds of these dyes of Formulae 4, 6, 7 (wherein $D_1$, K and $K_2$ have all the respective meanings stated) which contain a metallisable (for example, a hydroxyl, lower alkoxy or carboxylic acid) group ortho to the azo group in $D_1$.

*In class 1*

6-amino-1-hydroxy-2-(2′ - sulphophenylazo)naphthalene-3-sulphonic acid,
6-methylamino-1-hydroxy-2(4′-acetylamino-2′-sulphophenylazo)naphthalene-3-sulphonic acid,
8-amino-1-hydroxy-2(2′-sulphophenylazo)naphthalene-3:6-disulphonic acid,
8-amino-1-hydroxy-2-(4′chloro-2′-sulphophenylazo) naphthalene-3:5-disulphonic acid,
7-amino-2-(2′:5′-disulphophenylazo)-1-hydroxynaphthalene-3-sulphonic acid,
7-methylamino-2-(2′-sulphophenylazo)-1-hydroxynaphthalene-3-sulphonic acid,
7-methylamino-2-(4′-methoxy-2′-sulphophenylazo)-1-hydroxynaphthalene-3-sulphonic acid,
8-(3′-aminobenzoylamino)-1-hydroxy-2-(2′-sulphophenylazo)naphthalene-3:6-disulphonic acid,
8-amino-1-hydroxy-2:2′-azonaphthalene-1′:3:5′:6-tetrasulphonic acid,
6-amino-1-hydroxy-2-(4′acetylamino-2′-sulphophenylazo)naphthalene-3-sulphonic acid,
6-methylamino-1-hydroxy-2-(4′methoxy-2′sulphophenylazo)naphthalene-3-sulphonic acid,
8-amino-1-hydroxy-2-phenylazonaphthalene-3:6-disulphonic acid,
8-amino-1-hydroxy-2:2′azonaphthalene-1′:3:6-trisulphonic acid,
6-amino-1-hydroxy-2-(4′methoxy-2′-sulphophenylazo) naphthalene-3-sulphonic acid,
8-amino-1-hydroxy-2:2′-azonaphthalene-1′:3:5′-trisulphonic acid,
6-amino-1-hydroxy-2:2′-azonaphthalene-1′:3:5′-trisulphonic acid,
6-methylamino-1-hydroxy-2:2′azonaphthalene-1′:3:5′-trisulphonic acid,
7-amino-1-hydroxy-2:2′-azonaphthalene-1′:3-disulphonic acid,
8-amino-1-hydroxy-2-(4′-hydroxy-3′-carboxyphenylazo) naphthalene-3:5-disulphonic acid,
6-amino-1-hydroxy-2-(4′-hydroxy-3′-carboxyphenylazo) naphthalene-3:5-disulphonic acid

*In class 2*

2-(4′-amino-2′-methylphenylazo)naphthalene-4:8-disulphonic acid,
2-(4′-amino-2′-acetylaminophenylazo)naphthalene-5:7-disulphonic acid,
4-nitro-4′-(4″-methylaminophenylazo)stilbene-2:2′-disulphonic acid,
4-nitro-4′-(4″-amino-2″-methyl-5″-methoxyphenylazo) stilbene-2:2′-disulphonic acid,
2-(4′-amino-2′-acetylaminophenylazo)naphthalene-4:8-disulphonic acid,
4-amino-4′-(4″-methoxyphenylazo)stilbene-2:2′-disulphonic acid,
4-amino-2-methylazobenzene-2′:5′-disulphonic acid.

*In class 3*

1-(2′,5′-dichloro-4′-sulphophenyl)-3-methyl-4-(3″-amino-4″-sulphophenylazo)-5-pyrazolone,
1-(4′-sulphophenyl)-3-carboxy-4-(4″-amino-3″-sulphophenylazo)-5-pyrazolone,
1-(2′-methyl-5′-sulphophenyl)-3-methyl-4-(4″-amino-3″-sulphophenylazo)-5-pyrazolone,
1-(2′-sulphophenyl)-3-methyl-4-(3″-amino-4″-sulphophenylazo)-5-pyrazolone,
4-amino-4′-(3″-methyl-1″-phenyl-4″-pyrazol-5″-onylazo)stilbene-2:2′-disulphonic acid,
4-amino-4′-(2″-hydroxy-3″,6″-disulpho-1″-naphthylazo)stilbene-2:2′-disulphonic acid,
8-acetylamino-1-hydroxy-2-(3′-amino-4′-sulphophenylazo)naphthalene-3:6-disulphonic acid,
7-(3′-sulphophenylamino)-1-hydroxy-2-(4′-amino-2′-carboxyphenylazo)-naphthalene-3-sulphonic acid,
8-phenylamino-1-hydroxy-2-(4′-amino-2′-sulphophenylazo)naphthalene-3:6-disulphonic acid,
6-acetylamino-1-hydroxy-2-(5′-amino-2′-sulphophenylazo)naphthalene-3-sulphonic acid,
6-ureido-1-hydroxy-2-(5′-amino-2′-sulphophenylazo)-naphthalene-3-sulphonic acid,
8-benzoylamino-1-hydroxy-2-(5′-amino-2′-sulphophenylazo)naphthalene-3:6-disulphonic acid, 1-(4':8'-disulphonaphth-2'-yl)-3-methyl-4-(5''-amino-2''-sulphophenylazo)-5-pyrazolone,
1-(2'-5'-dichloro-4'-sulphophenyl)-3-methyl-4-(5''-amino-2''-sulphophenylazo)-5-pyrazolone.

*In class 4*

1-(3'-aminophenyl)-3-methyl-4-(2':5'-disulphophenylazo-5-pyrazolone,
1-(3'-aminophenyl)-3-carboxy-4-(2'-carboxy-4'-sulphophenylazo)-5-pyrazolone,
4-amino-4'-[3''-methyl-4''-(2''':5'''-disulphophenylazo)-1''-pyrazol-5''-onyl]stilbene-2:2'-disulphonic acid,

*In class 5*

The copper complex of 8-amino-1-hydroxy-2-(2'-hydroxy-5'-sulphophenylazo) naphthalene-3:6-disulphonic acid,
The copper complex of 6-amino-1-hydroxy-2-(2'-hydroxy-5'-sulphophenylazo) naphthalene-3-sulphonic acid.
The copper complex of 6-amino-1-hydroxy-2-(2'-hydroxy-5'-sulphophenylazo) naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 6-methylamino-1-hydroxy-2-(2'-carboxy-5'-sulphophenylazo)naphthalene-3-sulphonic acid,
The copper complex of 6-(4'-amino-3'-sulphoanilino)-1-hydroxy-2-(2''-carboxyphenylazo)naphthalene-3-sulphonic acid,
The 1:2-chromium complex of 7-amino-6'-nitro-1:2'-dihydroxy-2:1'-azonaphthalene-3:4'-disulphonic acid,
The 1:2-chromium complex of 6-amino-1-hydroxy-2-(2'-carboxyphenylazo)naphthalene-3-sulphonic acid,
The 1:2-chromium complex of 6-amino-1-hydroxy-2-(4'-nitro-2'-hydroxyphenylazo)naphthalene-3:6-disulphonic acid,
The 1:2-cobalt complex of 6-(4'-amino-3'-sulphoanilino)-1-hydroxy-2-(5''-chloro-2''-hydroxyphenylazo)naphthalene-3-sulphonic acid,
The 1:2-chromium complex of 1-(3'-amino-4'-sulphophenyl)-3-methyl-4-(2''-hydroxy-4''-sulpho-1''-naphthylazo)-5-pyrazolone,
The 1:2-chromium complex of 7-(4'-sulphoanilino)-1-hydroxy-2-(4''-amino-2''-carboxyphenylazo)naphthalene-3-sulphonic acid,
The 1:2-chromium complex of 1-(3'-aminophenyl)-3-methyl-4-(4''-nitro-2''-carboxyphenylazo)-5-pyrazolone,
The 1:2-chromium complex of 6-amino-6'-nitro-1:2'-dihydroxy-2:1'-azonaphthalene-3:4'-disulphonic acid,
The 1:2-cobalt complex of 6-amino-6'-nitro-1:2'-dihydroxy-2:1'-azonaphthalene-3:4'-disulphonic acid,
The 1:2-chromium complex of 8-amino-1-hydroxy-2-(2'-hydroxy-5'-nitrophenylazo)naphthalene-3:6-disulphonic acid,
The 1:2-chromium complex of 1-(3'-aminophenyl)-3-methyl-4-(2''-carboxy-4''-sulphophenylazo)-5-pyrazolone.

The new dyestuffs are reactive dyes suitable for colouring natural and artificial textile materials containing acylatable amine or hydroxyl groups, for example textile materials of wool, silk, polyamides and modified polyacrylonitrile fibers, and more especially cotton, viscose rayon and other regenerated celluloses. For this purpose the dyestuffs can be applied to the textile materials by dyeing from long liquors or by padding or by printing using printing pastes containing the conventional thickening agents or oil-in water emulsions or water-in-oil emulsions, whereby the textile materials are coloured in bright shades possessing excellent fastness to light and to wet treatments such as washing.

The new dyestuffs are particularly valuable for colouring cellulose textile materials. For this purpose the dyestuffs are preferably applied to the cellulose textile material in conjunction with a treatment with an acid-binding agent, for example, sodium bicarbonate, sodium carbonate, sodium metasilicate, trisodium phosphate or sodium hydroxide, which may be applied to the cellulose textile material before, during or after the application of the dyestuff.

Alternatively the new dyestuffs can be applied to cellulose textile materials by hte method described and claimed in U.K. specification No. 846,505, for example by padding or printing the textile material with an aqueous medium containing (a) the dyestuff, (b) a resin-forming composition and (c) a curing catalyst, optionally drying the treated textile material, and subsequently heating the textile material at a temperature above 100° C. preferably at a temperature between 130° and 170° C. whereby the textile material is simultaneously coloured and rendered resistant to creasing.

The new dyestuffs can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such a quaternary ammonium salts for example cetyl trimethylammonium bromide and cetyl pyridinium bromide and organic liquids such as n-butanol and benzyl alcohol.

The invention is illustrated but not limited by the following examples in which the parts and percentages are by weight.

EXAMPLE 1

A solution of 11.5 parts of the sodium salt of 4-amino-2-sulphoaniline in 150 parts of water is added with stirring to a solution of 35.5 parts of the disodium salt of 1 - (2':5' - dichloro - 4' - sulphophenyl) - 3 - methyl - 4 - [5' - (2'':4'' - dichlorotriazine - 6'' - ylamino) - 2'-sulphophenylazo]-5-pyrazolone in 500 parts of water and 30 parts of acetone and the mixture is heated at 45° to 50° C. for 2½ hours, the pH being maintained at 7 by the addition of a 10% aqueous solution of sodium carbonate. 10 parts of a 40% aqueous solution of methylamine are added and the mixture is heated at 80° C. for 10 hours. 70 parts of sodium chloride are added, the mixture is filtered and the residue on the filter is pressed as dry as possible. A solution of 22 parts of the trisodium salt of the compound so obtained in 400 parts of water is set stirring at 50° C. and a solution of 5.5 parts of 5-cyano-2:4:6-trichloropyrimidine in 40 parts of dioxan is added. The mixture is heated at 50° C. for 3 hours, the pH being maintained at 7 by the addition of a 10% aqueous solution of sodium carbonate. 40 parts of sodium chloride are added and the mixture is filtered. The residue on the filter is washed with acetone and is then dried. The dyestuff composition so obtained contains 2.0 atoms of hydrolysable chlorine per molecule. When applied to cellulose textile materials in conjunction with a treatment with an acid-binding agent, the dye yields greenish yellow shades having good fastness to washing and to light.

EXAMPLE 2

7.2 parts of the trisodium salt of 1-(2'':4''-dichlorotriazin - 6'' - ylamino)-7-(2'-sulphophenylazo)-8-naphthol-

| Example | Aminoazo Compound | Halogenotriazine | Diamine | Compound | Halogenopyrimidine | Shade |
|---|---|---|---|---|---|---|
| 4 | 1-(2':5'-dichloro-4'-sulphophenyl)-3-methyl-4-(3'-amino-6'-sulphophenyl azo)-5-pyrazolone. | Cyanuric chloride | m-Phenylene-diamine | Methylamine | 2:4:6-trichloropyrimidine | Greenish yellow. |
| 5 | 2-N-methylamino-6-(1':5'-disulphonaph-2'-ylazo)-5-naphthol-7-sulphonic acid. | do | do | Ammonia | 2:4:5:6-tetrachloropyrimidine | Reddish orange. |
| 6 | 1-amino-7-(2'-sulphophenylazo)-8-naphthol-3:6-disulphonic acid. | do | do | Sodium hydroxide | do | Red. |
| 7 | do | do | do | Ammonia | 5-cyano-2:4:6-trichloropyrimidine | Red. |
| 8 | do | do | 1,3-diaminobenzene-4-sulphonic acid | Methyl amine | do | Do. |
| 9 | do | do | 4-methylamino-3-sulphoaniline | β-Hydroxyethylamine ammonia | do | Do. |
| 10 | 2-N-methylamino-6-(4'-methoxy-4'-sulphophenylazo)-5-naphthol-7-sulphonic acid. | do | do | Ammonia | do | Scarlet. |
| 11 | Copper complex of 2-amino-6-(2'-hydroxy-5'-sulphophenylazo)-5-naphthol-1:7-disulphonic acid. | do | m-Phenylene diamine | do | 2:4:5-tetrachloropyrimidine | Rubine. |
| 12 | Copper complex of 1-amino-7-(2'-hydroxy-6'-amino-4'-sulphonaphth-1'-ylazo)-8-naphthol-2:4-disulphonic acid. | do | do | β-Hydroxy ethylamine | do | Blue. |
| 13 | Copper complex of 1-amino-7-(1'-hydroxy-4':8'-disulphonaphth-2'-ylazo)-8-naphthol-3:6-disulphonic acid. | do | do | Methylamine | do | Do. |
| 14 | 1-amino-7-(2'-sulpho-4'-methylphenylazo)-8-naphthol-3:6-disulphonic acid. | Cyanuric bromide | do | do | 5-cyano-2:4:6-trichloropyrimidine | Red. |
| 15 | 1-N-phenylamino-7-(4'-amino-2'-sulphophenylazo)-8-naphthol-3:6-disulphonic acid. | Cyanuric chloride | 1,4-diaminobenzene-sulphonic acid | Ammonia | do | Blue. |
| 16 | do | do | 4-methylaminoaniline | do | do | Do. |
| 17 | do | do | m-Phenylene diamine | do | 2:4:5:6-tetrachloropyrimidine | Do. |
| 18 | do | do | 4-methylamino-3-sulphoaniline | Aniline | 5-cyano-2:4:6-trichloropyrimidine | Do. |
| 19 | 1-amino-7-(2'-sulpho-4'-methylphenylazo)-8-naphthol-3:6-disulphonic acid. | do | m-Phenylene diamine | Methylamine | 2:4:5:6-tetrachloropyrimidine | Red. |
| 20 | 2-amino-6-(2':5'-disulphophenylazo)-5-naphthol-7-sulphonic acid. | do | do | 3-sulphoaniline | do | Orange. |
| 21 | do | do | do | 4-sulphoaniline | do | Do. |
| 22 | 2-(4'-amino-2'-ureidophenylazo)-naphthalene-3:6:8-trisulphonic acid. | do | do | Ammonia | do | Reddish yellow. |
| 23 | do | do | do | Methylamine | 5-cyano-2:4:6-trichloropyrimidine | Do. |
| 24 | do | do | 1,3-diaminobenzene-4-sulphonic acid | do | do | Do. |
| 25 | 1-(4'-sulphophenyl)-3-carboxy-4(5'-amino-2''-sulphophenylazo)-5-pyrazolone. | do | do | 5-sulpho-2-aminobenzoic acid | 5-aminocarbonyl-2:4:6-trichloropyrimidine | Greenish yellow. |
| 26 | 1-(4'-sulphophenyl)-3-carboxy-4(4''-amino-2''-sulphophenylazo)-5-pyrazolone. | do | m-Phenylenediamine | p-Aminobenzoic acid | 2:4:5:6-tetrachloropyrimidine | Reddish yellow. |
| 27 | 2-amino-6-(2':5'-disulphophenylazo)-5-naphthol-7-sulphonic acid. | do | do | Ethylamine | do | Orange. |
| 28 | 4-nitro-4'-(4''-methylaminophenylazo)stilbene-2:2'-disulphonic acid. | do | 4-methylamino-3-sulphoaniline | Ammonia | 5-cyano-2:4:6-tribromopyrimidine | Reddish yellow. |
| 29 | 1-amino-7-(1':5'-disulphonaphth-2'-ylazo)-8-naphthol-3:6-disulphonic acid. | do | m-Phenylene diamine | do | 2:4:5:6-tetrachloropyrimidine | Bluish red. |
| 30 | 1-amino-7-(1'-sulphonaphth-2'-ylazo)-8-naphthol-3:6-disulphonic acid. | do | 4-amino-3-sulphoaniline | do | 5-cyano-2:4:6-trichloropyrimidine | Do. |
| 31 | 1-amino-7-(3'-hydroxy-3'-sulpho-5'-nitrophenylazo)-8-naphthol-2:4-disulphonic acid. | do | 1,3-diaminobenzene-4-sulphonic acid | n-Butylamine | do | Blue. |
| 32 | 1-(3'-sulphophenyl)-3-carboxy-4-(1':5'-disulphonaphth-2'-ylazo)-5-pyrazolone. | do | p-Phenylenediamine | 3:5-disulphoaniline | 2:4:5:6-tetrachloropyrimidine | Greenish yellow. |
| 33 | 1:2 Chromium complex of 2-amino-6-(2'-carboxyphenylazo)-5-naphthol-7-sulphonic acid. | do | 4-amino-3-sulphoaniline | Ammonia | 5-cyano-2:4:6-tribromopyrimidine | Do. |
| 34 | 1:2 Cobalt complex of 2-(4'-amino-3'-sulphophenylamino)-7-(2'-hydroxy-5'-nitrophenylazo)-8-naphthol-6-sulphonic acid. | do | 4-N-methylamino-3-sulphoaniline | do | 5-cyano-2:4:6-trichloropyrimidine | Reddish brown. |
| 35 | 6-N-methylamino-2-(4'-methoxy-2'-sulphophenylazo)-1-naphthol-3-sulphonic acid. | do | do | do | do | Brown. |
| 36 | 8-amino-1-hydroxy-2:2'-azonaphthalene-1':8:6-trisulphonic acid. | do | 4-methylaminoaniline-3-sulphonic acid | do | do | Scarlet. |
| 37 | do | do | do | do | do | Bluish red. |

3:6-disulphonic acid are dissolved in 200 parts of water and to the solution there is added a solution of 2.2 parts of the sodium salt of 3-oxalylaminoaniline in 50 parts of water. The mixture is stirred at 40°–45° C. for 2½ hours, the pH of the solution being maintained at 7 by the addition of a 10% aqueous solution of sodium carbonate. 8 parts of aqueous ammonia solution (specific gravity 0.88) are ad ded and the mixture is heated at 80° C. for 10 hours. The solution is treated with 80 parts of sodium chloride and filtered. The paste is dissolved in 200 parts of N-sodium hydroxide solution and the solution heated at 85–90° C. for 2 hours to convert the oxalylamido group to amino. The mixture is neutralized to pH 6.5 with hydrochloric acid, then treated with 10 parts of sodium chloride and filtered. To a solution of 7.7 parts of the trisodium salt of the compound so obtained in 200 parts of water, there is added a solution of 2.2 parts of 2:4:5:6-tetrachloropyrimidine in 20 parts of acetone and the mixture is heated for 4 hours at 55°–60° C., the pH being maintained at 7 by the addition of a 10% aqueous solution of sodium carbonate. The solution is treated with 10 parts of sodium chloride, the mixture is filtered and the residue on the filter is then dried.

The dyestuff composition so obtained contains 1.6 atoms of hydrolysable chlorine per molecule. When applied to cellulose textile materials in conjunction with a treatment with an acid binding agent, the dye yields red shades having good fastness to washing and to light.

EXAMPLE 3

The 2.2 parts of oxalylamidoaniline used in Example 2 are replaced by an equimolar proportion of m-aminophenylsulphamic acid and the sulphamic acid group in the tertiary condensation product from cyanuric chloride so obtained is converted to amino by acid hydrolysis. Condensation of the aminomonoazo compound so obtained with 2:3:4:6-tetrachloropyrimidine yields a red dyestuff with identical shade and properties to that of Example 2.

The following table gives the shades of further examples of new dyestuffs of the invention obtained as described in Examples 1 to 3 by condensing the aminomonoazo compound listed in the second column of the table successively with the halogenotriazine named in column 3, the diamine compound listed in column 4 (one amino group being protected if necessary) the compound listed in column 5 and the halogenopyrimidine listed in column 6 of the table.

EXAMPLE 38

A solution from 10.5 parts of 2-methoxy-4:6-dichloro-s-triazine in 70 parts of acetone is added with stirring to a solution of 28.4 parts of the trisodium salt of 1-amino-7(2'-sulphophenylazo)-8-naphthol-3:6-disulphonic acid in 300 parts of water and the mixture is stirred for 3 hours at 40° C. the pH being maintained at 7 by the addition of a 10% aqueous solution of sodium carbonate. A solution of 15 parts of the sodium salt of 4-methylamino-3-sulphoaniline in 70 parts of water is added and the mixture is heated at 90° C. for 16 hours the pH being maintained at 8 by the addition of an aqueous solution of sodium carbonate. The mixture is acidified to pH 3 with hydrochloric acid and is then filtered. 22 parts of the tetra sodium salt of the compound so obtained are dissolved in 160 parts of water and the solution is set stirring at 50° C. A solution of 5.6 parts of 5-cyano-2:4:6-trichloropyrimidine in 30 parts of dioxan is added and the mixture is heated at 50°–60° C. for 2½ hours, the pH being maintained at 7 by the addition of a 10% aqueous solution of sodium carbonate, 35 parts of sodium chloride are added, the mixture is filtered and the residue on the filter is washed with acetone and is then dried.

The dyestuff composition so obtained contains 2.1 atoms of hydrolysable chlorine per molecule. When applied to cellulose textile materials in conjunction with a treatment with an acid-binding agent, the dye yields red shades having good fastness to washing and to light.

EXAMPLE 39

The 15 parts of the sodium salt of 4-methylamino-3-sulphoaniline used in Example 34 are replaced by an equimolar proportion of m-oxalylamidoaniline and the oxalylamide group in the resultant compound is converted to amino by hydrolysis in normal caustic soda solution. 19.2 parts of the trisodium salt of the aminoazo compound so obtained are dissolved in 400 parts of water and the solution is set stirring at 50° C. A solution of 10.5 parts of 2:4:5:6-tetrabromopyrimidine in 60 parts of dioxan is added and the mixture is heated at 55°–60° C. for 3 hours, the pH being maintained at 7 by the addition of a 10% aqueous solution of sodium carbonate. 28 parts of sodium chloride are added, the mixture is filtered and the residue is then dried.

The dyestuff so obtained contains 2.1 atoms of hydrolyzable bromine per molecule. When applied to cellulose textile materials in conjunction with a treatment with an acid-binding agent, the dyestuff yields greenish yellow shades having good fastness to washing and to light.

We claim:

1. Azo dyestuffs selected from the class consisting of monoazo compounds of the formula:

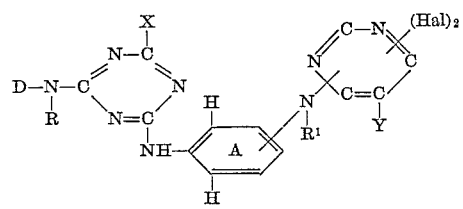

wherein D represents the radical of a water-soluble dyestuff of the monoazo series having the —NR— group directly attached through a carbon atom of an aryl ring or heterocyclic ring of the dyestuff radical, R and R¹ are independently selected from hydrogen and a lower alkyl group, X represents a non-labile group selected from methoxy, amino, methyl amino, β-hydroxyethylamino, phenylamino, 3-sulfophenylamino, 4-sulfophenylamino, 2-carboxy-4-sulfophenylamino, 4-carboxyphenylamine, ethylamino, butylamino and 3,5-disulfophenylamino and hydroxyl, Hal represents a halogen atom selected from chlorine and bromine, Y represents a group selected from hydrogen, chlorine, bromine, cyano and aminocarbonyl, and wherein the residue A can be further substituted by a sulphonic acid group, and 1:1 copper and 1:2 chromium and cobalt complexes of these compounds.

2. A dyestuff as claimed in claim 1 wherein D represents the radical of a water-soluble monoazo compound of the formula:

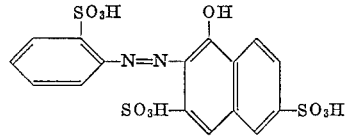

3. A dyestuff as claimed in claim 1 wherein D represents the radical of a water-soluble monoazo compound of the formula:

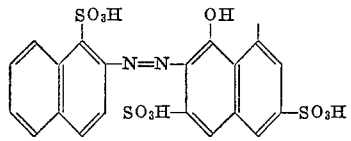

4. A dyestuff as claimed in claim 1 wherein D represents the radical of a water-soluble monoazo compound of the formula:

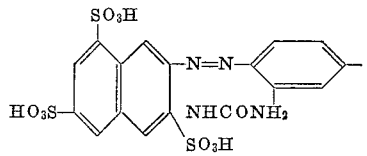

5. A dyestuff as claimed in claim 1, being the 1:1-copper complex of the water-soluble monoazo compound wherein D represents the radical of the formula:

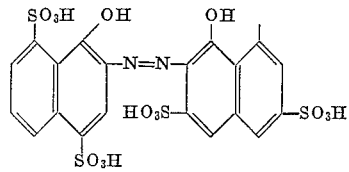

6. A dyestuff as claimed in claim 1, being the 1:2-chromium complex of the water-soluble monoazo compound wherein D represents the radical of the formula:

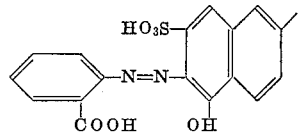

References Cited

UNITED STATES PATENTS

| 3,118,869 | 1/1964 | Berrie et al. | 260—146 |
| 3,133,911 | 5/1964 | Byland et al. | 260—153 |
| 3,149,100 | 9/1964 | Hindermann et al. | 260—153 |
| 3,226,176 | 12/1965 | Hindermann et al. | 260—153 X |

FOREIGN PATENTS 854,432   11/1960   Great Britain.

FLOYD D. HIGEL, *Primary Examiner.*